US007461834B2

(12) United States Patent
Hoshino et al.

(10) Patent No.: US 7,461,834 B2
(45) Date of Patent: Dec. 9, 2008

(54) WASTE LIQUID TREATMENT SYSTEM

(75) Inventors: Minoru Hoshino, Nagaoka (JP); Keiji Hokari, Nagaoka (JP); Tamotsu Hoshino, Nagaoka (JP); Yoshihiro Kyotani, Nagaoka (JP)

(73) Assignee: Limited Private Company Hoshimoto, Nagaoka-shi (JP)

( * ) Notice: Subject to any disclaimer, the term of this patent is extended or adjusted under 35 U.S.C. 154(b) by 482 days.

(21) Appl. No.: 11/403,932

(22) Filed: Apr. 14, 2006

(65) Prior Publication Data

US 2006/0231962 A1 Oct. 19, 2006

(30) Foreign Application Priority Data

Apr. 15, 2005 (JP) ............................ 2005-118623

(51) Int. Cl.
*B01F 3/04* (2006.01)
*C02F 9/00* (2006.01)
*A62D 3/40* (2007.01)

(52) U.S. Cl. ..................... 261/21; 261/78.2; 261/121.1; 96/189; 96/199; 210/258; 588/321

(58) Field of Classification Search .................. 261/21, 261/78.2, 115, 121.1, 140.1, 141; 96/188, 96/189, 199, 201; 210/175, 258; 422/307; 588/321

See application file for complete search history.

(56) References Cited

U.S. PATENT DOCUMENTS

| | | | | |
|---|---|---|---|---|
| 3,623,977 A * | 11/1971 | Reid | ........................ | 210/612 |
| 5,602,298 A * | 2/1997 | Levin | ........................ | 588/306 |
| 5,955,037 A * | 9/1999 | Holst et al. | ................ | 422/171 |
| 6,797,184 B2 * | 9/2004 | Shiota et al. | ................ | 210/762 |
| 2003/0079411 A1 * | 5/2003 | Kansa et al. | .................. | 48/77 |
| 2005/0070751 A1 * | 3/2005 | Capote et al. | .............. | 588/311 |
| 2005/0139486 A1 * | 6/2005 | Carson et al. | .............. | 205/688 |

FOREIGN PATENT DOCUMENTS

JP A 2001-259073 9/2001

* cited by examiner

*Primary Examiner*—Scott Bushey
(74) *Attorney, Agent, or Firm*—Oliff & Berridge, PLC

(57) ABSTRACT

A waste liquid treatment system includes a heat retaining/storage tank section adapted to store waste liquid, retaining the temperature thereof, an atomization chamber section capable of gasifying waste liquid by atomization and/or thermal vaporization, a heating/decomposition chamber section whose internal temperature is held in a thermal decomposition temperature range good for thermally decomposing harmful chemical substances contained in the mist and/or vapor gas of waste liquid when the mist and/or vapor gas of waste liquid passes through the inside thereof, a rapid cooling section for rapidly cooling decomposed exhaust gas and a vacuum pump section for drawing mist and/or vapor gas of waste liquid.

14 Claims, 4 Drawing Sheets

WASTE LIQUID TREATMENT SYSTEM

BACKGROUND OF THE INVENTION

1. Field of the Invention

This invention relates to a waste liquid treatment system that can be used when decomposing/treating waste liquid exhausted from a plant, waste liquid of cleaning liquid, dehydration liquid, raw material processing liquid or the like or waste liquid produced when decomposing stored harmful chemical substances containing chlorinated hydrocarbons.

2. Description of the Related Art

As disclosed in Japanese Patent Application Publication No. 2001-259073, there have been known waste liquid treatment systems using a dechlorination method, a hydrothermal oxidation method, an atomization/roasting method, a fluidization/roasting method and a photo-decomposition method.

However, the above listed known systems are accompanied by problems in terms of cost, processing capacity and safety depending on the type of waste liquid to be treated. Particularly, the problems are serious when mainly treating harmful chemical substances such as chlorinated hydrocarbons.

SUMMARY OF THE INVENTION

In view of the foregoing, it is an object of the present invention to dissolve the above-mentioned problems.

In order to achieve the above and other objects, the present invention provides, as a basic structure, a waste liquid treatment system including: a heat retaining/storage tank section for storing and retaining the heat of waste liquid; an atomization chamber section capable of atomizing and/or vaporizing/gasifying by heat the waste liquid from the heat retaining/storage tank section; a heating/decomposition chamber section adapted to maintain the inside thereof substantially in an oxygen-free low pressure atmosphere and at a thermal decomposition temperature level good for thermally decomposing harmful chemical substances mainly including, for example, chlorinated hydrocarbons contained in the mist and/or vapor gas of waste liquid coming from the atomization chamber section and passing through the inside thereof; a rapid cooling section for rapidly cooling the decomposed exhaust gas from the heating/decomposition chamber section; and a vacuum pump section capable of drawing mist and/or vapor gas of waste liquid from the inside of the atomization chamber section into the rapid cooling section by way of the heating/decomposition chamber section.

With the above-described configuration, waste liquid is stored in the heat retaining/storage tank section in a state where the heat is retained. Then, the waste liquid shows a low viscosity because the heat is retained and hence atomized well in an atomization chamber section. The vapor gas produced from the atomization chamber section as a result of atomization and/or gasification is thermally decomposed in a heating/decomposition chamber section. Since the heating/decomposition chamber section is adapted to maintain the inside thereof substantially in an oxygen-free low pressure atmosphere and the intra-chamber temperature is held to a thermal decomposition temperature level good for thermally decomposing harmful chemical substances mainly including, for example, chlorinated hydrocarbons contained in mist and/or vapor gas of waste liquid, waste liquid can be thermally decomposed at a temperature lower than the temperature at which waste liquid is decomposed under the atmospheric pressure and generation of poisonous gas and re-synthesis of other substances due to combustion can be suppressed. Thus, the harmful chemical substances and the odorous ingredients contained in exhaust gas can be efficiently decomposed. Additionally, the decomposed exhaust gas from the heating/decomposition chamber section is rapidly cooled by the rapid cooling section so that re-synthesis of harmful chemical substances can be suppressed and harmful chemical substances in vapor gas that mainly contain chlorinated hydrocarbons can be efficiently thermally decomposed to efficiently treat waste liquid.

The basic structure of the waste liquid treatment system may further include a chamber section having a filter capable of adsorbing and removing carbon contained in the exhaust gas from the rapid cooling section. With the provision of the filter capable of adsorbing and removing carbon contained in the exhaust gas from the rapid cooling section, the carbon that is produced as a result of decomposition can be removed and consequently re-synthesis of harmful chemical substances can be suppressed.

The basic structure of the waste liquid treatment system may further include a mist filter section capable of removing oil mist contained in the exhaust gas exhausted from the vacuum pump section. With the provision of the mist filter section, the oil mist contained in the exhaust gas that passes through the vacuum pump section can be reliably removed.

The basic structure of the waste liquid treatment system may further include a bubbling treatment section capable of treating the exhaust gas exhausted from the vacuum pump section with bubbles. With the provision of the bubbling treatment section, the chlorine contained in the exhaust gas is dissolved in water and hence can be caught as hydrochloric acid and the exhaust gas can be released into the atmosphere after reducing the gas harmless.

The basic structure of the waste liquid treatment system may further include a blower section capable of drawing in the exhaust gas exhausted from the vacuum pump section. With the provision of the blower section, removal of oil mist and a bubbling treatment can be conducted efficiently.

In the waste liquid treatment system, it is preferable that a plurality of plate-shaped aeration members, each having a plurality of airways, be arranged in parallel with and in spaced-apart relation with one another in the heating/decomposition chamber section and a plurality of heating members that are adapted to be brought into contact with mist and/or vapor gas of waste liquid be arranged among the aeration members.

With the provision of the plate-shaped aeration members and the heating members in the heating/decomposition chamber section, mist and/or vapor gas of waste liquid contact the outer peripheral surfaces of the heating members so that the harmful chemical substances and the odorous ingredients contained in the mist and/or vapor gas of waste liquid that by turn mainly contain chlorinated hydrocarbons can be efficiently decomposed as a result of the contact.

In the waste liquid treatment system, it is preferable that the rapid cooling section be formed by using a plurality of cylindrical liquid storage bodies capable of storing cooling liquid, each of the cylindrical liquid storage bodies being provided with a plurality of airways for allowing the decomposed exhaust gas to pass through. With the cylindrical liquid storage body, decomposed exhaust gas is reliably and rapidly cooled so that re-synthesis of harmful substances can be efficiently suppressed.

Further, in the waste liquid treatment system, it is preferable that the heating/decomposition chamber section maintain the inside thereof in a low pressure atmosphere of 10 Pa to 100 Pa. It is also preferable that the internal temperature of the heating/decomposition chamber section be 700° C. to 800° C. In the waste liquid treatment system, the cooling temperature of the rapid cooling section is preferably 5° C. to 15° C.

Vapor gas is thermally decomposed efficiently when the heating/decomposition chamber section is prepared to maintain the inside thereof in a low pressure atmosphere of 10 Pa to 100 Pa. Again, vapor gas is thermally decomposed efficiently when the internal temperature of the heating/decomposition chamber section is 700° C. to 800° C. When the cooling temperature of the rapid cooling section is 5° C. to 15° C., re-synthesis of harmful substances can be suppressed.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Figure 1:
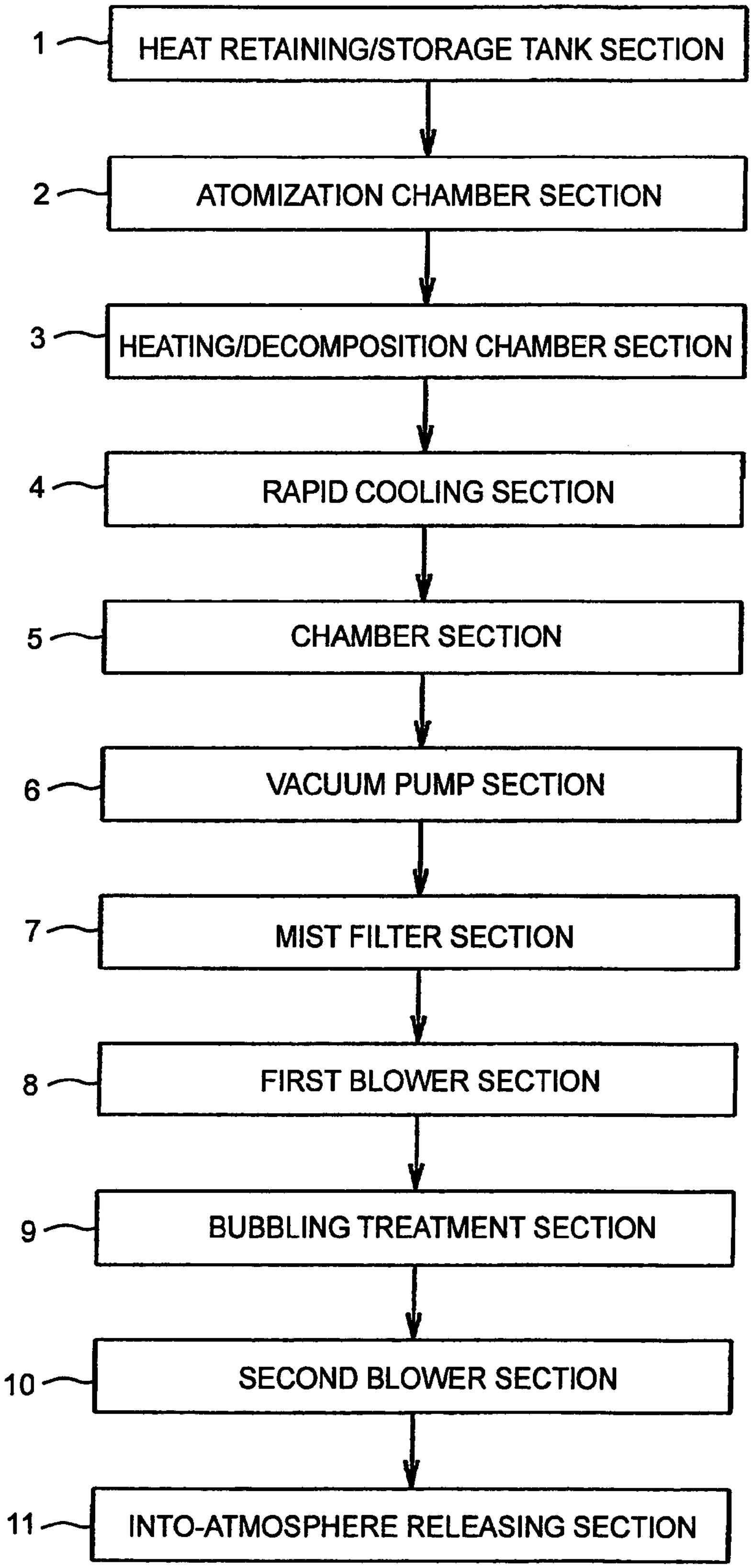
FIG. 1 is a schematic block diagram of an embodiment of the present invention, illustrating the configuration thereof.

FIGS. 1 through 6 schematically illustrate a preferred embodiment of the present invention. Referring to FIGS. 1 through 6, the embodiment includes a heat retaining/storage tank section 1, an atomization chamber section 2, a heating/decomposition chamber section 3, a rapid cooling section 4, a chamber section 5, a vacuum pump section 6, a mist filter section 7, a first blower section 8, a bubbling treatment section 9 and a second blower section 10.

The heat retaining/storage tank section 1 is so formed as to be capable of storing waste liquid W in a state where the heat is retained. Thus, waste liquid W is transferred typically from a waste liquid storage tank (not shown) to the heat retaining/storage tank section 1 by means of a pump and the transferred waste liquid W is stored in the tank of the heat retaining/storage tank section 1. The tank of the heat retaining/storage tank section 1 is held at about 50 to 80° C. so as to retain the temperature of the waste liquid W. Typically, the viscosity of waste liquid W is reduced when the temperature of the waste liquid W is held in a temperature in a range from 50 to 80° C.

Figure 2:
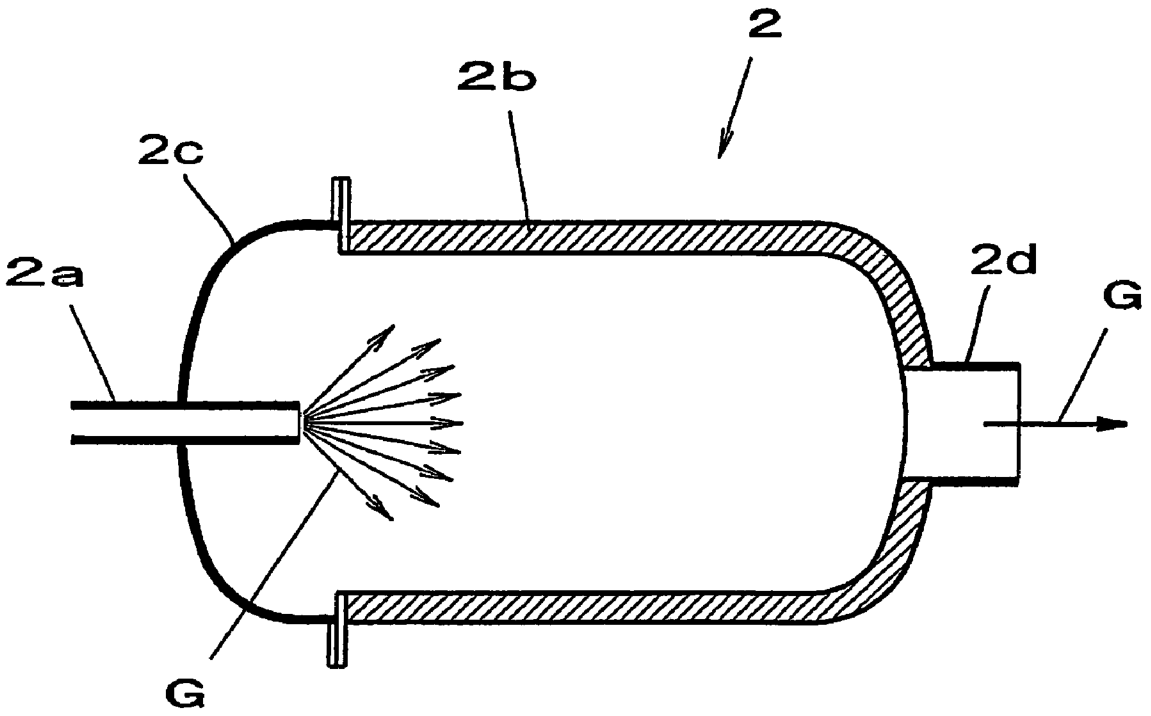
FIG. 2 is a schematic illustration of a part of the embodiment of FIG. 1.

As shown in FIG. 2, the atomization chamber section 2 includes a nozzle 2*a*, an atomization chamber formed from a first chamber wall 2*b* and a second chamber wall 2*c*, and an outflow port 2*d*. The nozzle 2*a* has one end fluidly connected to the heat retaining/storage tank section 1 and another end projected into the atomization chamber. The atomization chamber section 2 atomizes and/or gasifies the waste liquid W fed from the heat retaining/storage tank section 1. The waste liquid W fed from the heat retaining/storage tank section 1 is ejected from the nozzle 2*a* so as to be atomized and/or the first chamber wall 2*b* is heated so that mist of waste liquid may adhere to the chamber wall to become evaporated and gasified there. Thus, mist and/or vapor gas (which may hereinafter be referred to as "preprocessed matter G") of the waste liquid W is fed to the heating/decomposition chamber 3 through the outflow port 2*d*.

The heating/decomposition chamber section 3 is so formed as to maintain the inside of the chamber substantially in an oxygen-free low pressure atmosphere lower than atmospheric pressure and the intra-chamber temperature is held to a thermal decomposition temperature level good for thermally decomposing harmful chemical substances mainly including chlorinated hydrocarbons contained in the preprocessed matter G of waste liquid coming from the atomization chamber section 2 as the preprocessed matter G passes through the inside of the chamber.

Figure 3:
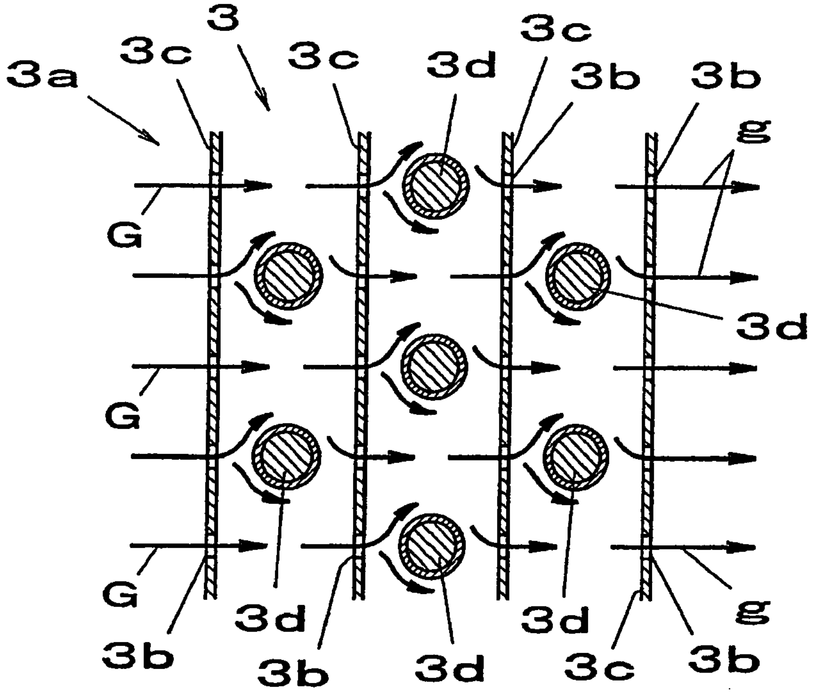
FIG. 3 is a schematic illustration of another part of the embodiment of FIG. 1.

As shown in FIG. 3, the heating/decomposition chamber section 3 is formed by arranging a plurality of plate-shaped aeration members 3*c* that are made of ceramic, each having a plurality of airways 3*b*, in parallel with and in spaced-apart relation with one another in a hermetically sealed vessel body 3*a* and also arranging a plurality of heating members 3*d*, which are formed respectively by using ceramic pipes so as to contain respective rod-shaped heaters in the inside and adapted to be brought into contact with the preprocessed matter G of waste liquid W among the aeration members 3*c*. Then, electric power is supplied from a power feeding section (not shown) to the heating members 3*d* and the preprocessed matter G of waste liquid W is brought into contact with the outer peripheral surfaces of the heating members 3*d* so that the harmful chemical substances and the odorous ingredients contained in the preprocessed matter G of waste liquid W that by turn mainly contain chlorinated hydrocarbons are thermally decomposed as a result of the contact.

The inside of the heating/decomposition chamber section 3 is, in this illustrative example, held in a low-pressure atmosphere of 10 Pa to 100 Pa. The lower limit of the internal pressure of the heating/decomposition chamber section 3 is defined to be equal to 10 Pa because the cost of installing a vacuum pump that can evacuate the inside of the heating/decomposition chamber section 3 to a pressure level lower than 10 Pa will be too high, whereas the upper limit of the internal pressure of the heating/decomposition chamber section 3 is defined to be equal to 100 Pa because the decomposition temperature of waste liquid W is raised above a predetermined temperature range to make it difficult to decompose waste liquid W when the internal pressure of the chamber section is higher than 100 Pa. The internal temperature of the heating/decomposition chamber section 3 is held to a range between 700° C. and 800° C. Vapor gas G may not be thermally decomposed efficiently when brought into contact with the heating members 3*d* when the internal temperature is lower than 700° C. The upper limit of the temperature range is defined to be equal to 800° C. because vapor gas G is decomposed sufficiently at or lower than 800° C. in an oxygen-free low pressure atmosphere.

Figure 4:
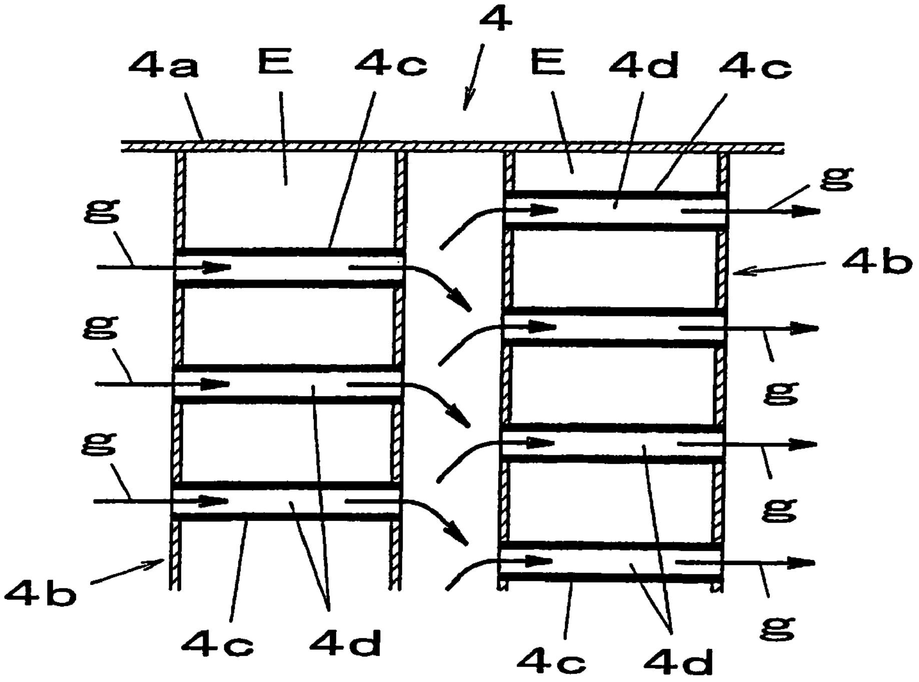
FIG. 4 is a schematic illustration of still another part of the embodiment of FIG. 1.

The rapid cooling section 4 is adapted to rapidly cool the decomposed exhaust gas g coming from the heating/decomposition chamber section 3. As shown in FIG. 4, the rapid cooling section 4 is formed by arranging a plurality of cylindrical liquid storage bodies 4*b* that are capable of storing cooling liquid E in a hermetically sealed vessel body 4*a*. Each of the cylindrical liquid storage bodies 4*b* is provided with a plurality of through pipes 4*c* that are adapted to operate as so many airways 4*d* and allow the decomposed exhaust gas g to pass through.

The cooling temperature of the rapid cooling section 4 is defined to be within a range between 5° C. and 15° C. in order to enable generation of poisonous gases and re-synthesis of harmful chemical substances to be suppressed.

Figure 5:
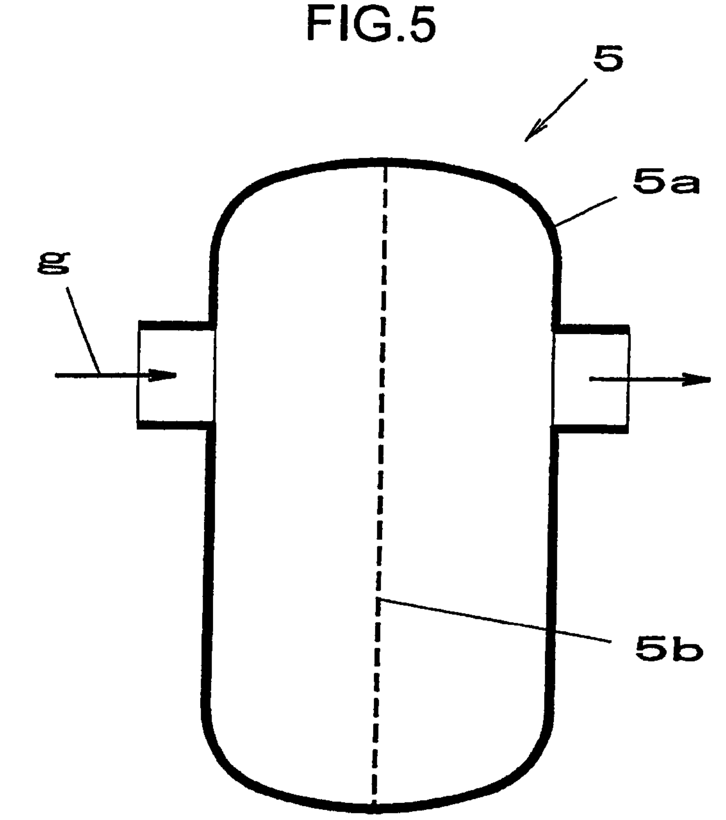
FIG. 5 is a schematic illustration of still another part of the embodiment of FIG. 1.

As shown in FIG. 5, the chamber section 5 has a filter **5*b* that is arranged in a hermetically sealed vessel body 5*a* and capable of adsorbing and removing carbon contained in the exhaust gas g from the rapid cooling section 4**.

The vacuum pump section 6 is adapted to be able to draw preprocessed matter G of waste liquid W from the outflow port **2*d* of the atomization chamber section 2 into the rapid cooling section 4 via the heating/decomposition chamber section 3 and maintain the inside of the heating/decomposition chamber section 3** substantially in an oxygen-free low pressure atmosphere.

The mist filter section 7 is provided with a filter capable of removing oil mist contained in the exhaust gas g exhausted from the vacuum pump section 6. The first blower section 8 is adapted to draw the exhaust gas g exhausted from the vacuum pump section 6.

Figure 6:
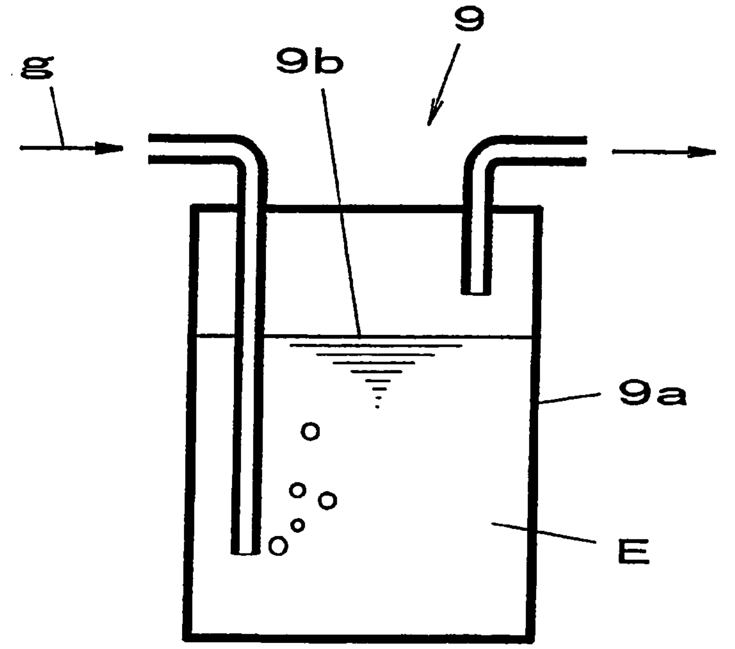
FIG. 6 is a schematic illustration of still another part of the embodiment of FIG. 1.

As shown in FIG. 6, in the bubbling treatment section 9, the exhaust gas g exhausted from the vacuum pump section 6 is subjected to bubbling treatment by ejecting the exhaust gas g below the surface level **9*b* of the water contained in a water tank section 9*a***.

The second blower section 10 is adapted to be able to draw the exhaust gas g above the surface level **9*b* of the water in the bubbling treatment section 9 and release the gas g into the atmosphere from an into-atmosphere releasing section 11**.

Thus, with this embodiment having the above-described configuration, waste liquid W containing harmful chemical substances, which typically contain chlorinated hydrocarbons by turn, is stored in the heat retaining/storage tank section 1 in a state where the heat is retained. Then, the waste liquid W whose viscosity is reduced as a result of being stored in a state where the heat is retained is atomized and/or vaporized and gasified by heat in the atomization chamber section 2. Thereafter, the vapor gas or preprocessed matter G produced as a result of atomization and/or gasification is drawn into the heating/decomposition chamber section 3 by the vacuum pump section 6 so that the inside of the heating/decomposition chamber section 3 is maintained substantially in an oxygen-free low pressure atmosphere and at a thermal decomposition temperature level good for thermally decomposing harmful chemical substances mainly including chlorinated hydrocarbons contained in the preprocessed matter G of waste liquid W coming from the atomization chamber section 2. Thus, the harmful chemical substances mainly including chlorinated hydrocarbons contained in the preprocessed matter G of waste liquid W axe chemically decomposed as they pass through the inside of the heating/decomposition chamber section 3 and the decomposed exhaust gas g from the heating/decomposition chamber section 3 is drawn into the rapid cooling section 4 by the vacuum pump section 6 and rapidly cooled as the gas g passes through the rapid cooling section 4.

Therefore, waste liquid W is stored in the heat retaining/storage tank section 1 in a state where the heat is retained. Then, the waste liquid W whose viscosity is reduced as a result of being stored in a state where the heat is retained is efficiently atomized in the atomization chamber section 2. Thereafter, the vapor gas G produced as a result of atomization and/or gasification is thermally decomposed in the heating/decomposition chamber section 3 so that the inside of the heating/decomposition chamber section 3 is maintained substantially in an oxygen-free low pressure atmosphere and at a thermal decomposition temperature level good for thermally decomposing harmful chemical substances mainly including chlorinated hydrocarbons contained in the mist and/or vapor gas G of waste liquid. Thus, the waste liquid W can be thermally decomposed at temperatures lower than the temperature level required for decomposing the liquid W under the atmospheric pressure and at the same time generation of poisonous gases and re-synthesis of harmful substances can be suppressed. Harmful chemical substances, odorous ingredients or the like contained in the exhaust gas g can be efficiently decomposed and the decomposed exhaust gas g from the heating/decomposition chamber section 3 is rapidly cooled by the rapid cooling section 4 so that re-synthesis of harmful chemical substances can be suppressed. Then, harmful chemical substances mainly including chlorinated hydrocarbons contained in the vapor gas G can be efficiently thermally decomposed and hence the waste liquid can be efficiently treated.

Since the chamber section 5 has a filter capable of adsorbing and removing carbon contained in the exhaust gas g from the rapid cooling section 4, re-synthesis of harmful chemical substances can be prevented as a result of removing the carbon produced by the thermal decomposition. Additionally, since the mist filter section 7 is provided with a filter capable of removing oil mist contained in the exhaust gas g exhausted from the vacuum pump section 6, the oil mist contained in the exhaust gas g passing through the vacuum pump section 6 can be reliably removed. Still additionally, since the bubbling treatment section 9 is adapted to be able to treat the exhaust gas g exhausted from the vacuum pump section with bubbles, chlorine contained in the exhaust gas g is dissolved in water and hence can be caught as hydrochloric acid and thus exhaust gas g that is reduced harmless can be released into the atmosphere. Since the blower sections 8, 10 are adapted to be able to draw the exhaust gas g exhausted from the vacuum pump section 6, removal of oil mist and a bubbling treatment can be efficiently conducted.

Additionally, when a plurality of plate-shaped aeration members **3*c*, each having a plurality of airways 3*b*, are arranged in parallel with each other in the heating/decomposition chamber section 3 and a plurality of heating members 3*d* that are adapted to be brought into contact with the mist and/or vapor gas G of waste liquid W are arranged among the aeration members 3*c*, the mist and/or vapor gas G of waste liquid contact the outer peripheral surfaces of the heating members 3*d* so that the harmful chemical substances and the odorous ingredients contained in the mist and/or vapor gas G that by turn mainly contain chlorinated hydrocarbons can be efficiently thermally decomposed as a result of the contact. Additionally, since the rapid cooling section 4 is formed by arranging a plurality of cylindrical liquid storage bodies 4*b* that are capable of storing cooling liquid E and provided with a plurality of airways 4*d*** and allow the decomposed exhaust gas g to pass through, the decomposed exhaust gas g is reliably and rapidly cooled to suppress re-synthesis of harmful substances.

Additionally, since the inside of the heating/decomposition chamber section 3 is held in a low pressure atmosphere of 10 Pa to 100 Pa, vapor gas G can be efficiently thermally decomposed. Additionally, since the internal temperature of the heating/decomposition chamber section is 700° C. to 800° C., vapor gas G can be efficiently thermally decomposed. Still additionally, since the cooling temperature of the rapid cooling section 4 is 5° C. to 15° C., re-synthesis of harmful substances can be suppressed.

The present invention is by no means limited to the above-described embodiment. For example, the heat retaining/storage tank section 1, the atomization chamber section 2, the heating/decomposition chamber section 3, the rapid cooling section 4 and other structural components may be modified appropriately in terms of their design.

What is claimed is:

1. A waste liquid treatment system comprising:

a heat retaining/storage tank section that stores waste liquid and retains heat of the waste liquid;

an atomization chamber section that performs at least one of atomization and gasification of the waste liquid fed from the heat retaining/storage tank section and produces a preprocessed matter in a form of mist or vapor gas;

a heating/decomposition chamber section having an inner space through which the preprocessed matter passes, the inner space of the heating/decomposition chamber being maintained substantially in an oxygen-free low pressure atmosphere lower than atmospheric pressure and at a thermal decomposition temperature capable of thermally decomposing chemical substances contained in the preprocessed matter fed from the atomization chamber section, the heating/decomposition chamber producing decomposed exhaust gas;

a rapid cooling section that rapidly cools the decomposed exhaust gas fed from the heating/decomposition chamber section and produces exhaust gas; and a vacuum pump section that draws the preprocessed matter from the atomization chamber section into the rapid cooling section via the heating/decomposition chamber section.

2. The waste liquid treatment system according to claim 1, wherein the heat retaining/storage tank section comprises a tank in which the waste liquid is stored, the tank being held in a temperature in a range from 50° C. to 80° C.

3. The waste liquid treatment system according to claim 1, wherein the heat retaining/storage tank section comprises a tank in which the waste liquid is stored, the tank being held in a temperature high enough for the atomization chamber to atomize the waste liquid.

4. The waste liquid treatment system according to claim 1, wherein the atomization chamber section comprises:

an atomization chamber;

a nozzle projected into the atomization chamber, the nozzle creating mist of the waste liquid; and an outflow port formed in the atomization chamber, wherein at least a part of walls defining the atomization chamber is heated to create vapor gas of the waste liquid.

5. The waste liquid treatment system according to claim 1, wherein the thermal decomposition temperature level in the heating/decomposition chamber is set to thermally decompose chemical substances including chlorinated hydrocarbons contained in the preprocessed matter.

6. The waste liquid treatment system according to claim 5, wherein the internal temperature of the heating/decomposition chamber section is 700° C. to 800° C.

7. The waste liquid treatment system according to claim 1, further comprising a chamber section having a filter that absorbs and removes carbon contained in the exhaust gas fed from the rapid cooling section.

8. The waste liquid treatment system according to claim 1, further comprising a mist filter section that removes oil mist contained in the exhaust gas fed from the vacuum pump section.

9. The waste liquid treatment system according to claim 1, further comprising a bubbling treatment section wherein the exhaust gas fed from the vacuum pump section is subject to bubbling treatment.

10. The waste liquid treatment system according to claim 1, further comprising a blower section that draws the exhaust gas fed from the vacuum pump section.

11. The waste liquid treatment system according to claim 1, wherein the heating/decomposition chamber section comprises:

a plurality of plate-shaped aeration members arranged in parallel with and in spaced-apart relation with one another, wherein each plate-shaped aeration member is formed with a plurality of airways and oriented in a direction to traverse a flow of the preprocessed matter; and a plurality of heating members disposed in interspaces between adjacent two of the plurality of plate-shaped aeration members.

12. The waste liquid treatment system according to claim 1, wherein the rapid cooling section comprises:

a plurality of cylindrical liquid storage bodies that store cooling liquid; and a plurality of airways that allows the decomposed exhaust gas to pass through.

13. The waste liquid treatment system according to claim 1, wherein the inner space of the heating/decomposition chamber section is maintained in the low pressure atmosphere of 10 Pa to 100 Pa.

14. The waste liquid treatment system according to claim 1, wherein the cooling temperature of the rapid cooling section is 5° C. to 15° C.

* * * * *